(12) United States Patent
Cookson et al.

(10) Patent No.: US 8,698,878 B2
(45) Date of Patent: Apr. 15, 2014

(54) 3-D AUTO-CONVERGENCE CAMERA

(75) Inventors: Chris Cookson, Studio City, CA (US); George H. Joblove, Hollywood, CA (US); David L. Hays, Los Angeles, CA (US)

(73) Assignees: Sony Corporation, Tokyo (JP); Sony Pictures Entertainment, Inc, Culver City, CA (US)

( * ) Notice: Subject to any disclaimer, the term of this patent is extended or adjusted under 35 U.S.C. 154(b) by 700 days.

(21) Appl. No.: 12/649,218

(22) Filed: Dec. 29, 2009

(65) Prior Publication Data
US 2011/0001797 A1 Jan. 6, 2011

Related U.S. Application Data

(60) Provisional application No. 61/222,829, filed on Jul. 2, 2009.

(51) Int. Cl.
*H04N 13/02* (2006.01)

(52) U.S. Cl.
USPC .......................................... 348/47

(58) Field of Classification Search
None
See application file for complete search history.

(56) References Cited

U.S. PATENT DOCUMENTS

| | | | |
|---|---|---|---|
| 4,751,570 A | 6/1988 | Robinson | |
| 5,737,655 A * | 4/1998 | Inaba | 396/324 |
| 5,778,268 A | 7/1998 | Inaba | |
| 5,892,994 A | 4/1999 | Inaba | |
| 6,748,105 B1 * | 6/2004 | Mancuso et al. | 382/154 |
| 6,804,056 B2 | 10/2004 | Yano et al. | |
| 7,181,136 B2 | 2/2007 | Perisic | |
| 7,303,131 B2 | 12/2007 | Carlson et al. | |
| 2005/0117033 A1 * | 6/2005 | Matsui | 348/239 |
| 2006/0139371 A1 * | 6/2006 | Lavine et al. | 345/620 |
| 2007/0171524 A1 * | 7/2007 | Steinthal et al. | 359/466 |
| 2007/0237514 A1 * | 10/2007 | Pillman et al. | 396/153 |
| 2007/0248260 A1 | 10/2007 | Pockett | |

(Continued)

FOREIGN PATENT DOCUMENTS

| | | |
|---|---|---|
| JP | 02-139677 A | 5/1990 |
| JP | 8329875 A | 12/1996 |
| WO | 2007/057808 A2 | 5/2007 |

OTHER PUBLICATIONS

International Search Report and Written Opinion dated Feb. 11, 2011 from International Patent Application No. PCT/US2010/040932, 9 pages.

(Continued)

*Primary Examiner* — Sath V Perungavoor
*Assistant Examiner* — Kate Luo
(74) *Attorney, Agent, or Firm* — Procopio, Cory, Hargreaves & Savitch, LLP

(57) ABSTRACT

Automatically converging a plurality of images for use in a stereoscopic camera system including a plurality of 2-D cameras, including: receiving a focal distance from each of the plurality of 2-D cameras; calculating a focal distance of the stereoscopic camera system by using the focal distances received from the plurality of 2-D cameras; determining a center of interest using the calculated focal distance of the stereoscopic camera system; receiving the plurality of images from the plurality of 2-D cameras, wherein each of the plurality of images is generated by each of the plurality of 2-D cameras using the focal distance; and cropping the plurality of images to adjust directions of view of the plurality of 2-D cameras to converge at the center of interest.

10 Claims, 8 Drawing Sheets

(56) References Cited

U.S. PATENT DOCUMENTS

| | | | |
|---|---|---|---|
| 2007/0285663 | A1 | 12/2007 | Hewitt et al. |
| 2008/0088706 | A1* | 4/2008 | Girgensohn et al. ..... 348/207.99 |
| 2008/0156882 | A1* | 7/2008 | Tsikos et al. ............. 235/462.43 |
| 2008/0240704 | A1* | 10/2008 | Takahashi ...................... 396/419 |
| 2008/0316301 | A1* | 12/2008 | Givon .............................. 348/49 |

OTHER PUBLICATIONS

Deschenes et al., "Simultaneous Computation of Defocus Blur and Apparent Shifts in Spatial Domain," cipprs.org, original publication date unknown, accessed at http://www.cipprs.org/vi2002/pdf/s5-1.pdf, 8 pages.

Gokstorp, "Computing depth from out-of-focus blur using a local frequency representation," IEEE 1051-4651/94, Oct. 9, 1994, accessed at http://ieeexplore.ieee.org/xpl/freeabs_all.jsp?arnumber=576248, pp. 153-158.

Kornfeld, "A Simple Viewfinder for Stereoscopic Video Capture Systems," ETH Zurich, original publication date unknown, accessed at http://www.stereo.ethz.ch/Publications/Pubs,%20Reports%20and%20Thesis_files/A%20Simple%20Viewfinder%20for%20Stereoscopic%20Video%20Capture%20Systems.pdf, pp. 1-6.

Leroy et al., "Real Time Monocular Depth from Defocus," ICISP, 2008, accessed at http://www.springerlink.com/content/w4w75354l7404437/fulltext.pdf?page=1, pp. 103-111.

Park, "An image-based calibration technique of spatial domain depth-from-defocus," Pattern Recognition Letters, 2006, 27:1318-1324.

Xian et al., "Depth-from-Defocus: Blur Equalization Technique," Proc. of SPIE, 2006, 6382:63820E, pp. 1-10.

Zhang et al., "A Novel Technique of Image-Based Camera Calibration in Depth-from-Defocus," IEEE 7695-3391-9/08, Nov. 1, 2008, pp. 483-486.

* cited by examiner

US 8,698,878 B2

3-D AUTO-CONVERGENCE CAMERA

CROSS-REFERENCE TO RELATED APPLICATIONS

This application claims the benefit of priority under 35 U.S.C. §119(e) of U.S. Provisional Patent Application No. 61/222,829, filed Jul. 2, 2009, entitled "3-D Camera Auto-convergence." The disclosure of the above-referenced application is incorporated herein by reference.

BACKGROUND

1. Field of the Invention

The present invention relates to a stereoscopic imaging system, and more specifically, to automatically converging images used in such a stereoscopic imaging system.

2. Background

Stereoscopic imaging systems provide synchronized presentation of different images to the left and right eyes of a user. Alignment of these different images by the left and right eyes is an important factor in the development of any stereoscopic imaging system. Some conventional systems include manual alignment in which an operator selects the input imaging parameters on a display unit, such as camera field of view and convergence distance. In these systems, a stereoscopic display could be designed to provide assistance in correctly aligning the display geometry to match the imaging geometry, either by automatically moving the display components, or providing visual feedback to the operator with test patterns that allow for accurate manual alignment. Some existing auto-alignment techniques include providing a left and right alignment pattern on the left-eye and right-eye image screens, and adjusting the displays to converge by moving display elements of the screens.

SUMMARY

Embodiments of the present invention provide for automatically converging a plurality of images for use in a stereoscopic camera system.

In one implementation, a method of automatically converging a plurality of images for use in a stereoscopic camera system including a plurality of 2-D cameras is disclosed. The method including: receiving a focal distance from each of the plurality of 2-D cameras; calculating a system focal distance of the stereoscopic camera system by using the focal distances from the plurality of 2-D cameras; determining a center of interest using the calculated system focal distance of the stereoscopic camera system; receiving the plurality of images from the plurality of 2-D cameras, wherein each of the plurality of images is generated by each of the plurality of 2-D cameras using the focal distance; and cropping the plurality of images to adjust directions of view of the plurality of 2-D cameras to converge at the center of interest.

In another implementation, a stereoscopic camera system for automatically converging a plurality of images is disclosed. The system including: a plurality of 2-D cameras including a first 2-D camera and a second 2-D camera, wherein the first 2-D camera comprises a first lens which captures and projects a first image of the plurality of images on a first image sensor, and the second 2-D camera comprises a second lens which captures and projects a second image of the plurality of images on a second image sensor; and a processor configured to: (1) receive and process focal distances of the plurality of images from the plurality of 2-D cameras to calculate a system focal distance of the stereoscopic camera system; (2) determine a center of interest using the calculated system focal distance of the stereoscopic camera system; and (3) receive and crop the plurality of images to adjust directions of view of the plurality of 2-D cameras to converge at the center of interest.

In another implementation, a stereoscopic camera system for automatically converging a plurality of images is disclosed. The system including: a plurality of 2-D cameras, each 2-D camera comprising a lens which captures and projects an image on an image sensor; and a processor configured to: (1) vertically crop the plurality of images to adjust for eccentricities of lenses in the plurality of 2-D cameras; (2) receive and process focal distances of the plurality of images to calculate a system focal distance of the stereoscopic camera system; (3) determine a center of interest using the calculated system focal distance of the stereoscopic camera system; and (4) receive and crop the plurality of images to adjust directions of view of the plurality of 2-D cameras to converge at the center of interest.

In yet another implementation, a computer-readable storage medium storing a computer program for automatically converging a plurality of images for use in a stereoscopic camera system including a plurality of 2-D cameras is disclosed. The computer program includes executable instructions that cause a computer to: receive a focal distance from each of the plurality of 2-D cameras; calculate a system focal distance of the stereoscopic camera system by using the focal distances from the plurality of 2-D cameras; determine a center of interest using the calculated system focal distance of the stereoscopic camera system; and receive and crop the plurality of images to adjust directions of view of the plurality of 2-D cameras to converge at the center of interest.

Other features and advantages of the present invention will become more readily apparent to those of ordinary skill in the art after reviewing the following detailed description and accompanying drawings.

DETAILED DESCRIPTION

Certain implementations as disclosed herein provide for automatically converging images used in a stereoscopic imaging system. After reading this description it will become apparent how to implement the invention in various alternative implementations and alternative applications. However, although various implementations of the present invention will be described herein, it is understood that these implementations are presented by way of example only, and not limitation. As such, this detailed description of various alternative implementations should not be construed to limit the scope or breadth of the present invention.

Figure 1:
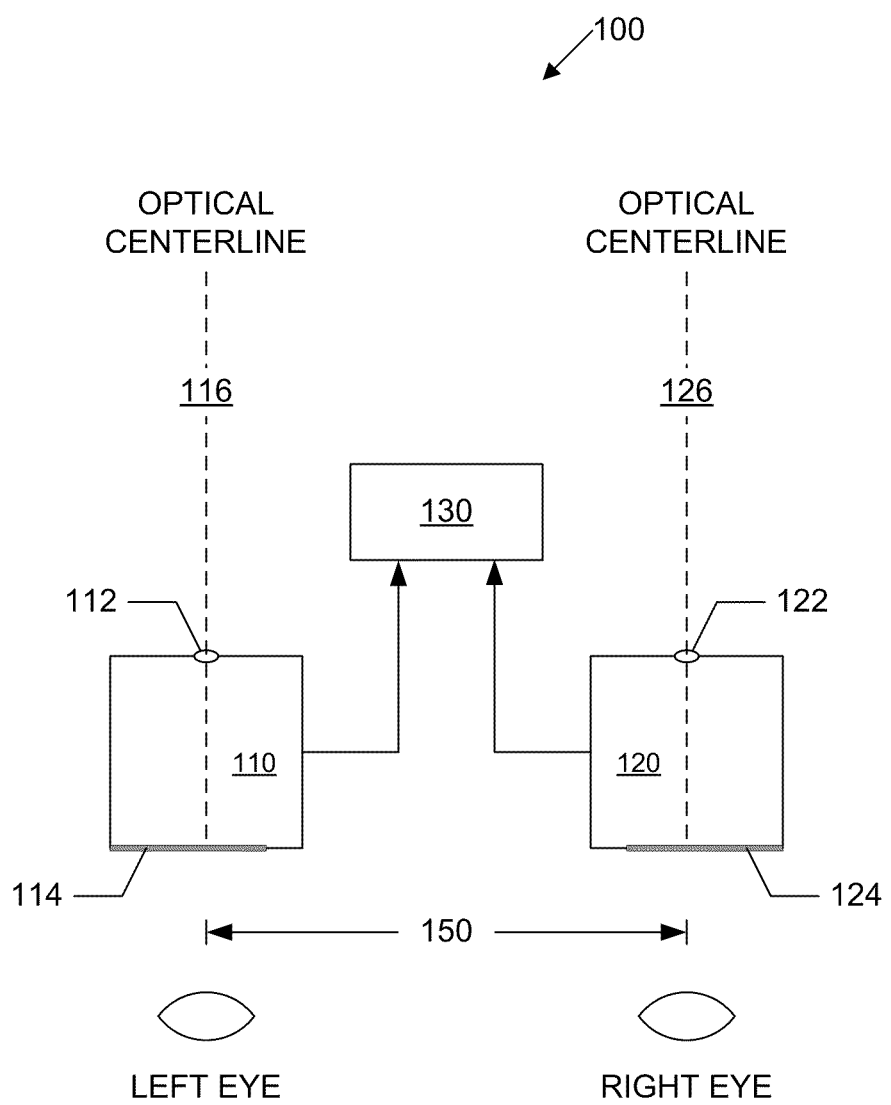
FIG. 1 shows a schematic view of a stereoscopic (e.g., 3-D) camera system including two 2-D cameras, each 2-D camera having a sensor-lens combination, in accordance with one implementation of the present invention.

FIG. 1 shows a schematic view of a stereoscopic (e.g., 3-D) camera system 100 including two 2-D cameras 110, 120, each 2-D camera having a sensor-lens combination. Although the illustrated implementation of FIG. 1 shows a "camera" configured as a combination of a single lens and a single sensor, in other implementations, the term "camera" can be used to refer to multiple lens/sensor combinations in a single unit or enclosure.

The 2-D camera 110 includes a lens 112 and an image sensor 114. The lens 112 captures and projects a field of view having an optical centerline 116 onto the image sensor 114. The 2-D camera 120 includes a lens 122 and an image sensor 124. The lens 122 captures and projects a field view having an optical centerline 126 onto the image sensor 124. The optical centerline 116 of the 2-D camera 110 is configured to be displaced an inter-pupillary distance 150 (e.g., approximately 6 to 7 centimeters) from the optical centerline 126 of the 2-D camera 120. Accordingly, in one implementation, the 2-D camera 110 is configured to capture and output an image for the left eye, while the 2-D camera 120 is configured to capture and output an image for the right eye. In the illustrated implementation of FIG. 1, the stereoscopic camera system 100 also includes a processor 130 that is configured to automatically converge the two images captured by the 2-D cameras 110, 120.

Figure 2:
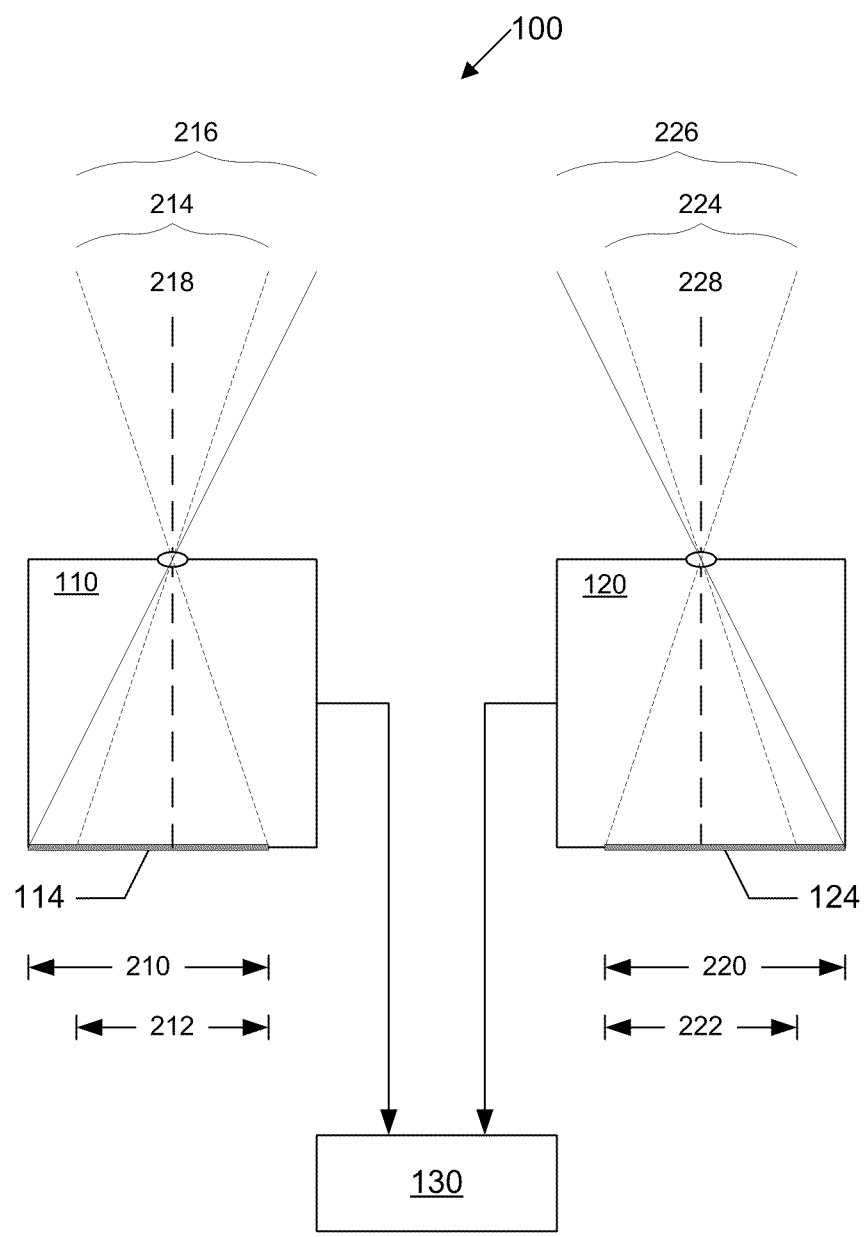
FIG. 2 shows another view of the stereoscopic camera system illustrated in FIG. 1 but including fields of view and effective sensor widths provided by cropping.

In one implementation shown in FIG. 1 and FIG. 2, the image sensors 114, 124 are horizontally offset from the optical centerlines 218, 228. In other implementations, the image sensors are not offset. In the illustrated implementation, the image sensor 114 is offset to the left to provide a full width 210, while the image sensor 124 is offset to the right to provide a full width 220. Therefore, a full field of view 216 or 226 of each sensor 110 or 120 is horizontally asymmetric with respect to the optical centerline 218 or 228 of the lens 112 or 122.

To yield images centered on the optical centerlines (e.g., 218, 228), the images can be horizontally cropped to provide parallel fields of view 214, 224. For example, the image projected on the image sensor 114 is "right cropped" to provide an effective sensor width 212 with a corresponding parallel field of view 214. Thus, the term "right cropped" refers to cropping a strip on the left side of the image projected on the image sensor 114. Furthermore, the image projected on the image sensor 124 is left cropped to provide an effective sensor width 222 with a corresponding parallel field of view 224. Thus, the term "left cropped" refers to cropping a strip on the right side of the image projected on the image sensor 124. In general terms, strips are cropped on far sides from the middle of the inter-pupillary distance to focus on distant objects, while the strips are cropped on near sides from the middle of the inter-pupillary distance to focus on near objects. Accordingly, the optical centerlines 218, 228 correspond to parallel lines of sight with substantially zero convergence. It is interesting to note that the cropped area defines a nominal resolution of the camera. In other implementations, the images can be cropped in patterns other than horizontal to provide convergence of multiple images into a single 3-D image (e.g., diagonally).

Figure 3:
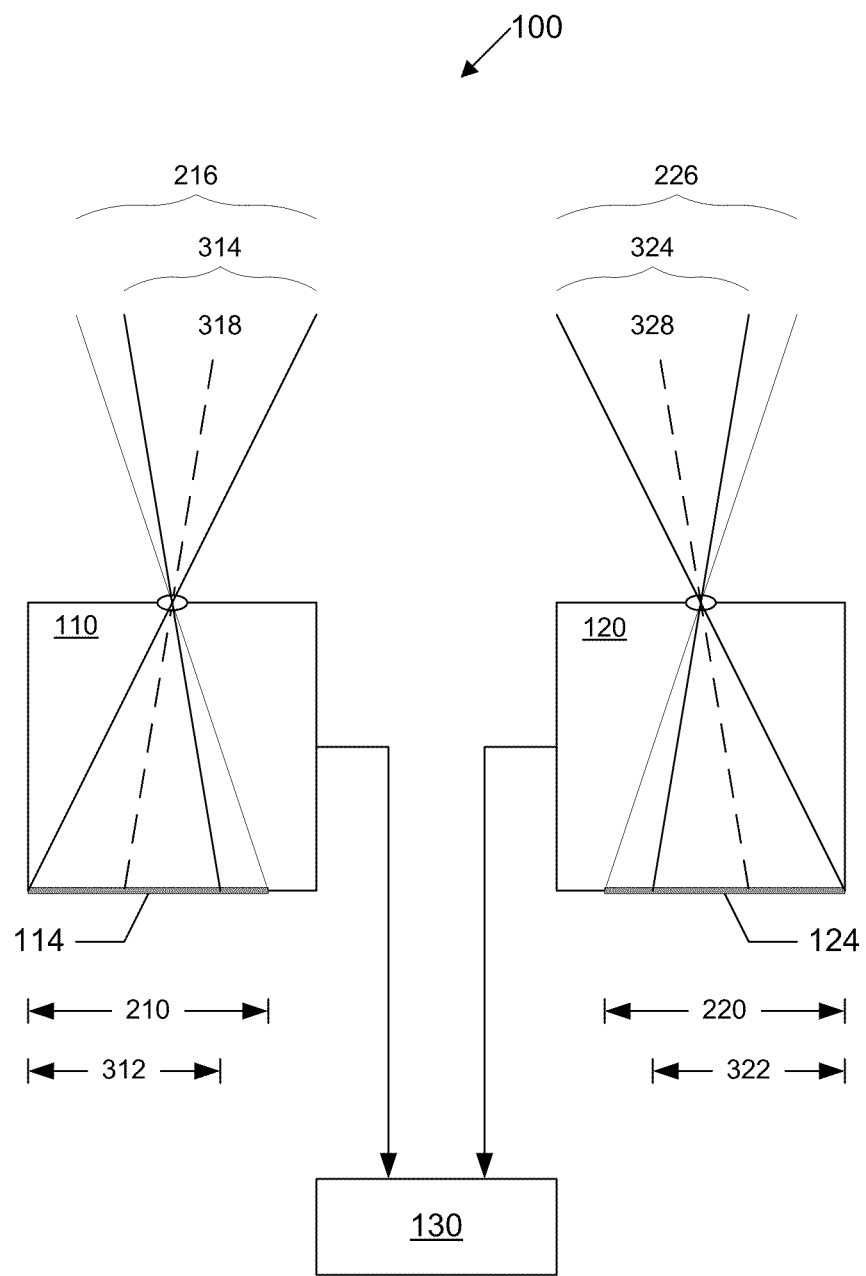
FIG. 3 shows the stereoscopic camera system of FIG. 1 showing converging optical centerlines.

FIG. 3 shows the stereoscopic camera system 100 with converging optical centerlines 318, 328. In the illustrated implementation of FIG. 3, the centerlines 318, 328 are controlled to converge by adjusting the cropping of the images captured by the image sensors rather than by adjusting the lenses of the cameras 110, 120. As discussed above, asymmetrically cropping an image can change both the field of view and the optical centerline of the image. For example, the image captured by the image sensor 114 is left cropped to provide an effective sensor width 312 with a corresponding "converged" field of view 314. Furthermore, the image captured by the image sensor 124 is right cropped to provide an effective sensor width 322 with a corresponding "converged" field of view 324.

Figure 4:
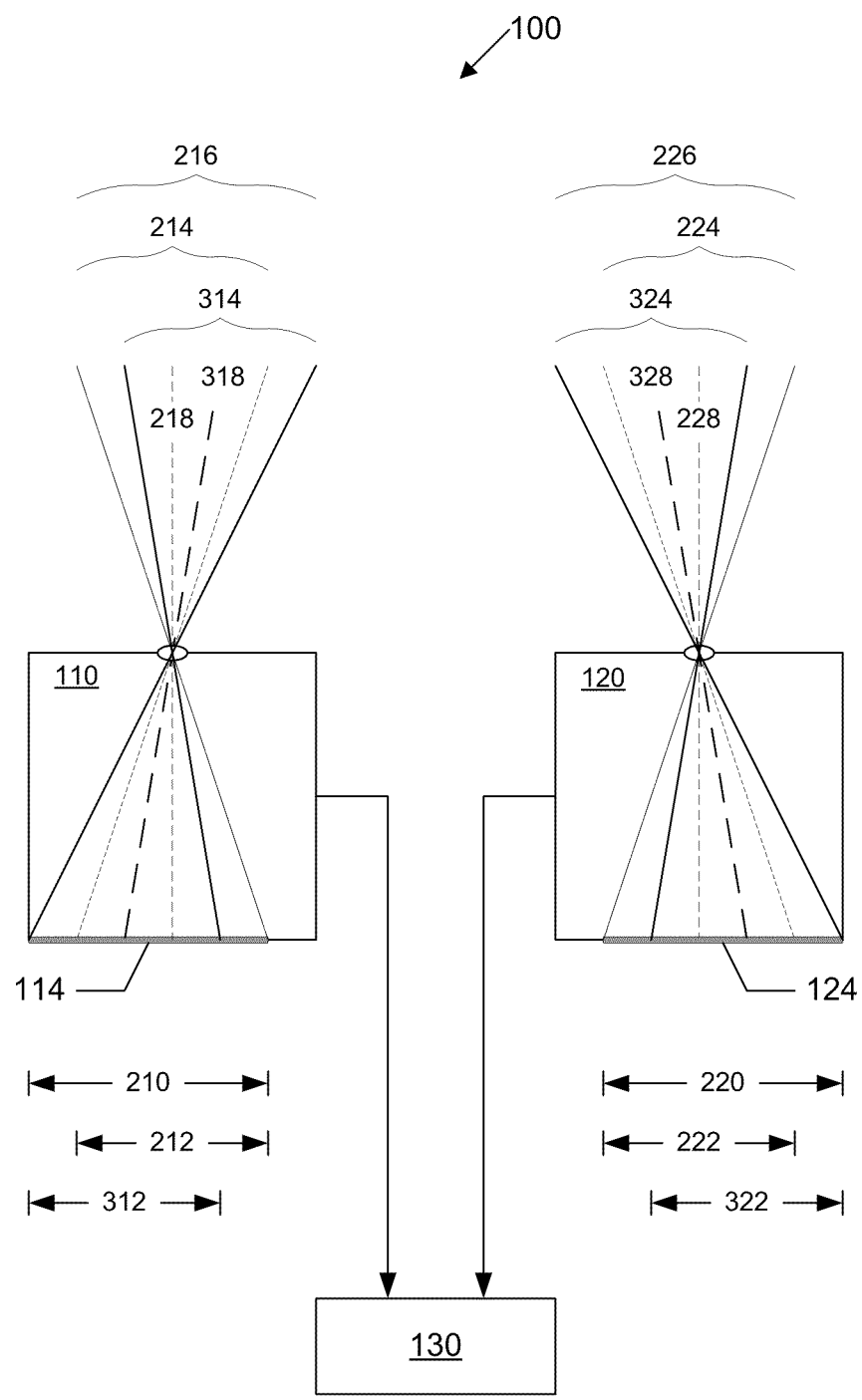
FIG. 4 shows the stereoscopic camera system of FIG. 1 further showing techniques for automatically converging the images.

In FIG. 4, the stereoscopic camera system 100 provides for automatically converging the images generated by the two 2-D cameras 110, 120, each 2-D camera having a sensor-lens combination. The automatic convergence of the images involves determining the center of interest and the depth plane using focal distances received from the two image sensor-lens combinations. The focal distance can be determined using an auto-focus mechanism, manual focus by a camera operator, or other focusing and/or measuring means external to the camera. In one implementation, each 2-D camera generates an image along with metadata including a focal distance. The focal distance is then extracted from the received metadata.

In one implementation, the center of interest is determined by averaging the focal distances of the two cameras 110, 120. In another implementation, the center of interest is determined by measuring a focal distance of a lens (not shown) at the middle between the two cameras 110, 120. Thus, by having the auto-convergence be driven by the focal distance of the camera, the center of interest can be maintained at screen depth in a stereoscopic image (e.g., a 3-D image). Further, this allows cuts and dissolves in a 3-D video to be comfortable to the eyes of the viewer.

In the illustrated implementation of FIG. 4, directions of view of the two cameras 110, 120 are controlled to converge at the center of interest by digitally adjusting the horizontal position of the crop of the two images rather than by the movement of the lenses. For example, the image projected on the image sensor 114 can be right cropped to focus on distant objects straight ahead (along the centerline 218) with a parallel field of view 214 (with an effective sensor width 212), or can be left cropped to focus on closer objects along the "converging" centerline 318 with a "converged" field of view 314 (with an effective sensor width 312). Furthermore, the image projected on the image sensor 124 can be left cropped to focus on distant objects straight ahead (along the centerline 228) with a parallel field of view 224 (with an effective sensor width 222), or can be right cropped to focus on closer objects along the "converging" centerline 328 with a "converged" field of view 324 (with an effective sensor width 322).

Figure 5:
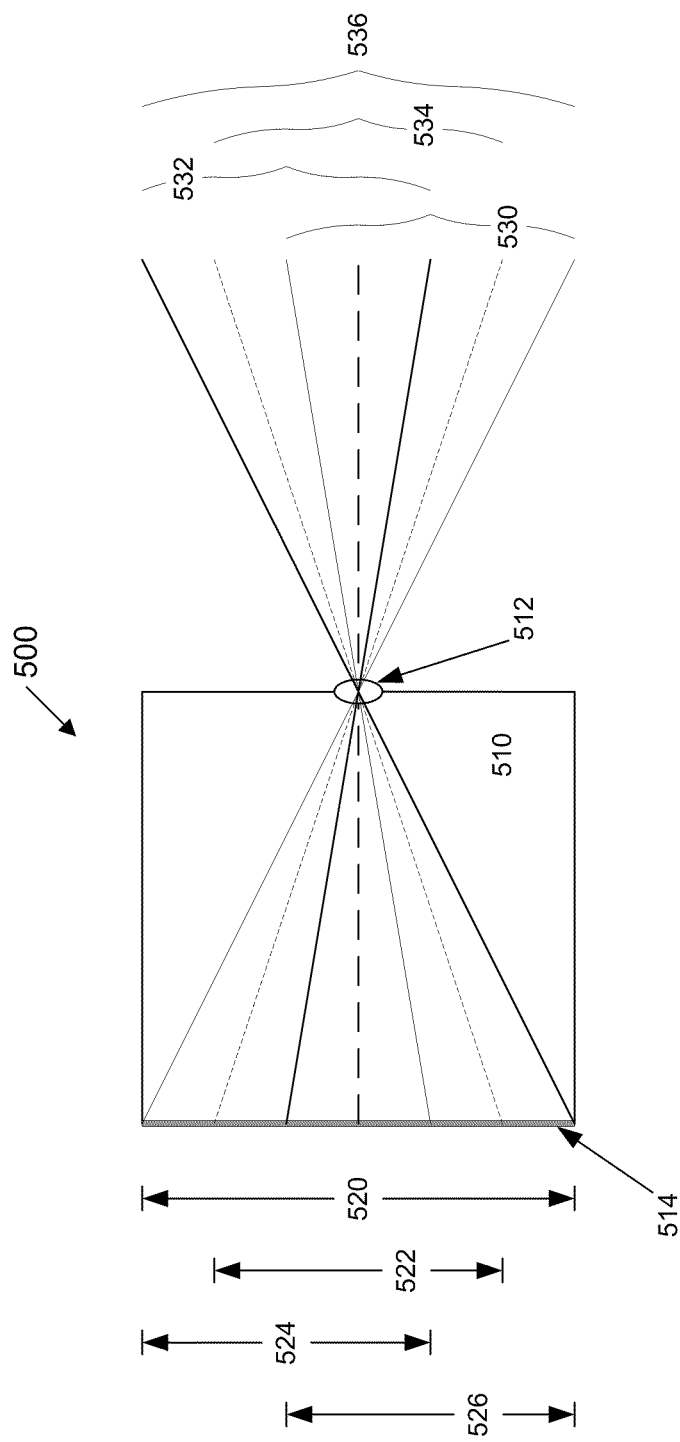
FIG. 5 shows a stereoscopic camera system in accordance with another implementation of the present invention.

FIG. 5 shows a stereoscopic camera system 500 in accordance with another implementation of the present invention. Although FIG. 5 shows only one 2-D camera 510, the digital manipulation of the image projected by a lens 512 on a sensor 514 is equally applicable to another 2-D camera (not shown). In the illustrated implementation of FIG. 5, a vertical adjustment of each eye's view is made possible by using a sensor similarly oversized in the vertical dimension, and by digitally adjusting the vertical position of the cropping. For example, an image can be: (1) center-cropped (providing an effective sensor width 522) to adjust a full field of view 536 down to a vertical field of view 534; (2) up-cropped (providing an effective sensor width 524) to adjust a full field of view 536 down to a vertical field of view 530; or (3) down-cropped (providing an effective sensor width 526) to adjust a full field of view 536 down to a vertical field of view 532.

A system similar to the stereoscopic camera system 500 (shown in FIG. 5) using above-described techniques of cropping (horizontal and/or vertical) can be used to control optical centerlines to adjust for eccentricities of a lens which causes positional variations during zooming. The ability to digitally adjust each eye's view horizontally and/or vertically enables the camera system to compensate for the positional variations caused by the lens eccentricities. In this implementation, the vertical cropping of an image is adjusted to compensate for lens eccentricities because the lens eccentricities cause mainly vertical position variations. However, the horizontal cropping of an image can also be used, in addition to the vertical cropping, to compensate for lens eccentricities which cause horizontal position variations. In one implementation, the camera system corrects for any lens eccentricity using a look-up table of crop values defined for the lens at various levels of zoom. The crop values include horizontal and/or vertical crop values needed to correct the lens eccentricity.

Figure 6:
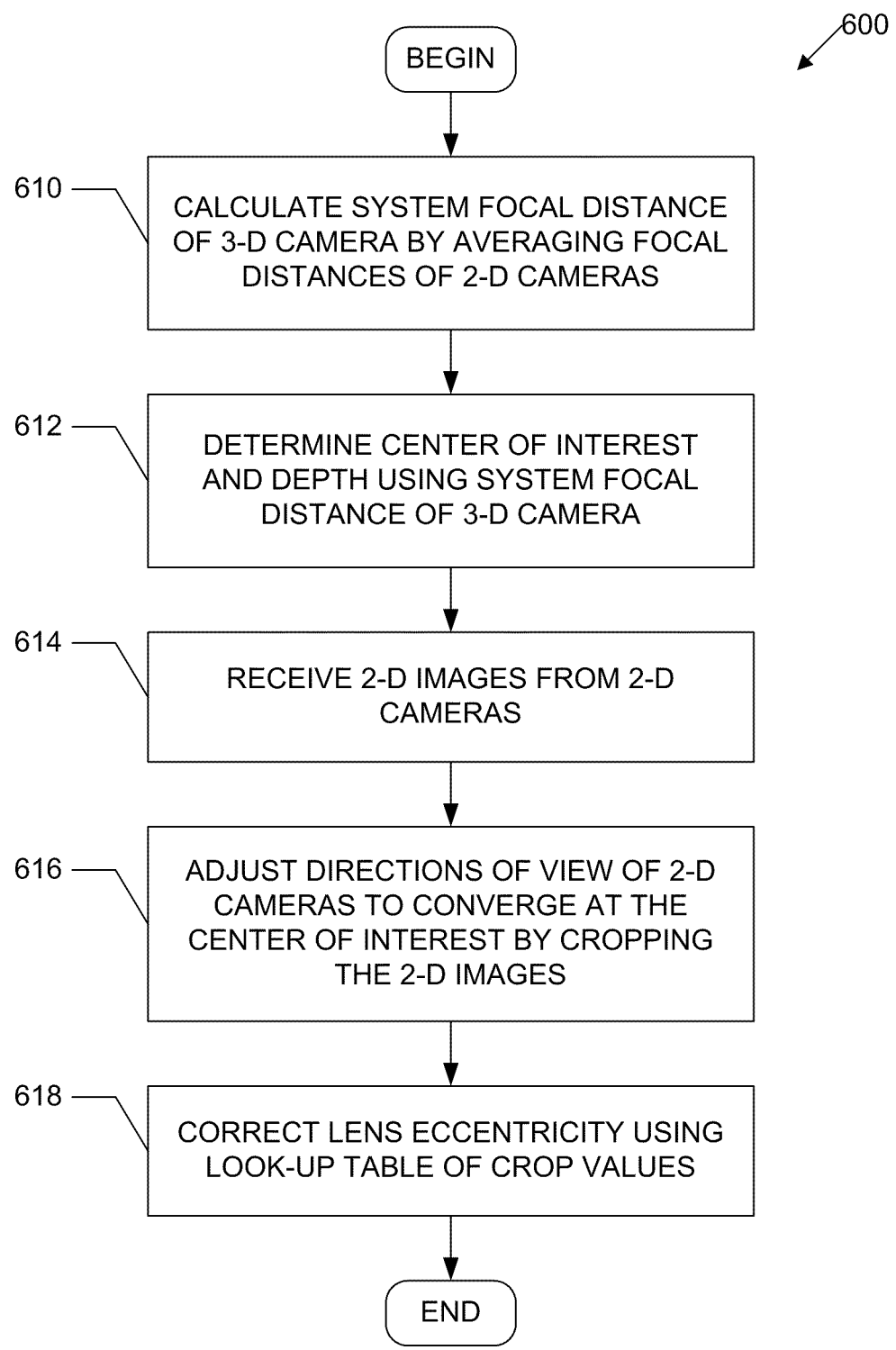
FIG. 6 is a flowchart illustrating a technique of automatically converging a plurality of images, which can be used in a stereoscopic camera system, in accordance with one implementation of the present invention.

FIG. 6 is a flowchart 600 illustrating a technique of automatically converging a plurality of images, in accordance with one implementation of the present invention. In one implementation, the plurality of images is automatically converged into a single stereoscopic image. In the illustrated implementation of FIG. 6, the system focal distance of the stereoscopic camera system is calculated, at box 610, by using the focal distances of images from 2-D cameras. In one implementation, the focal distance information is received by the processor of the stereoscopic camera system from the 2-D cameras.

From the result calculated in box 610, the center of interest and the depth plane are determined, at box 612. In one implementation, the center of interest is determined by averaging the focal distances of the two 2-D cameras. Thus, by having the auto-convergence be driven by the focal distance of the camera, the center of interest can be maintained at screen depth in a stereoscopic image (e.g., a 3-D image).

Once the center of interest is determined, the plurality of images which has been focused by the 2-D cameras is received, at box 614. The directions of view of the 2-D cameras are then adjusted to converge at the center of interest by cropping the received 2-D images, at box 616, as described above.

As mentioned above, the above-described techniques of cropping (horizontal and/or vertical) can be used to control optical centerlines to adjust for eccentricities of a lens which causes positional variations during zooming. The ability to digitally adjust each eye's view horizontally and/or vertically enables the camera system to compensate for the positional variations caused by the lens eccentricities. In one implementation, the camera system corrects for any lens eccentricity, at box 618, using a look-up table of crop values defined for the lens at various levels of zoom. The crop values include horizontal and/or vertical crop values needed to correct the lens eccentricity.

Figure 7:
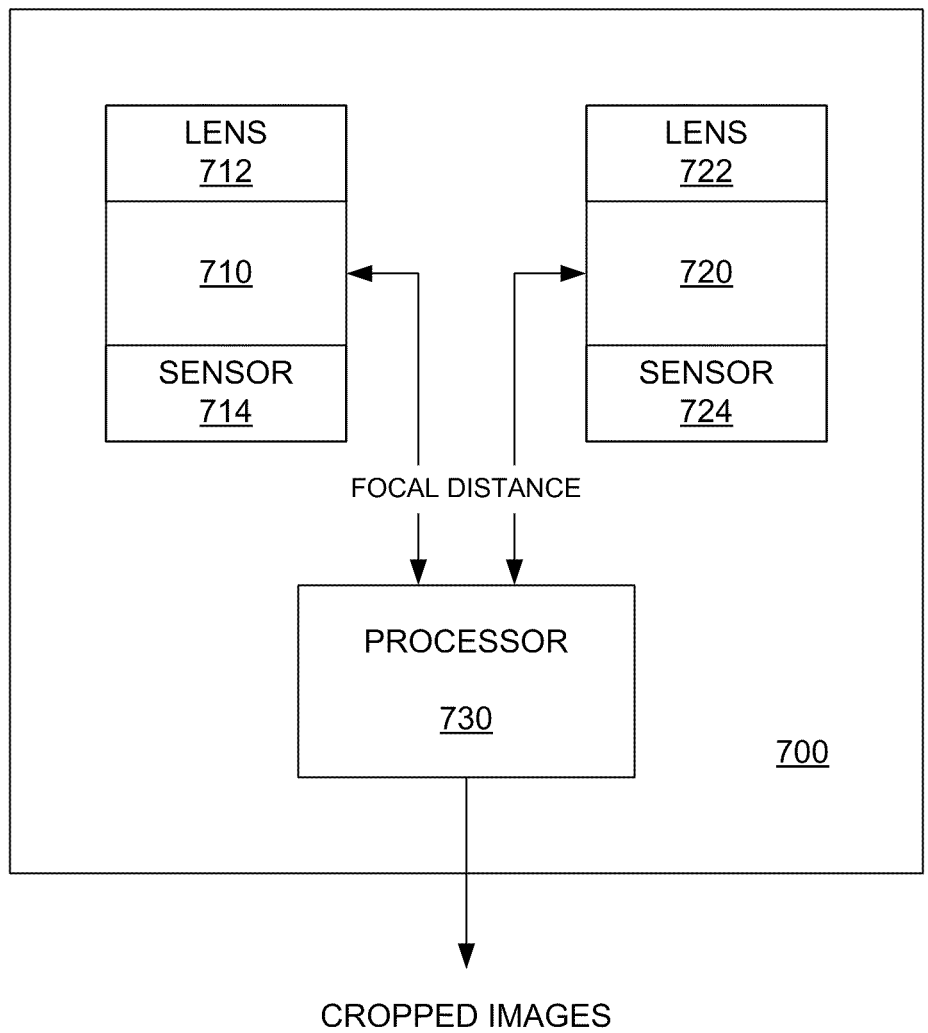
FIG. 7 is a block diagram of a stereoscopic camera system providing automatic convergence of a plurality of images, in accordance with one implementation of the present invention.

FIG. 7 is a block diagram of a stereoscopic camera system 700 providing automatic convergence of a plurality of images, in accordance with one implementation of the present invention. In one implementation, the plurality of images is automatically converged into a single stereoscopic image. The stereoscopic camera system 700 includes two 2-D cameras 710, 720 and a processor 730. The 2-D camera 710 includes a lens 712 which captures and projects an image on an image sensor 714. The 2-D camera 720 includes a lens 722 which captures and projects an image on an image sensor 724.

In the illustrated implementation of FIG. 7, focal distances of images from the 2-D cameras 710, 720 are received and processed by the processor 730 to calculate the focal distance of the stereoscopic camera system 700. The processor 730 then determines the center of interest and the depth plane from the calculated focal distance of the stereoscopic camera system 700. In one implementation, the center of interest is determined by averaging the focal distances of the two 2-D cameras. Thus, by having the auto-convergence be driven by the focal distance of the camera, the center of interest can be maintained at screen depth in a stereoscopic image (e.g., a 3-D image).

Once the center of interest is determined, the focused images from the 2-D cameras 710, 720 are received at the processor 730, which processes the received images. The processor 730 is configured to adjust the directions of view of the 2-D cameras 710, 720 to converge at the center of interest by cropping the 2-D images, as described above, rather than by moving the lenses 712, 714.

Further, the processor 730 can perform cropping (horizontal and/or vertical) to control optical centerlines to adjust for eccentricities of a lens which causes positional variations during zooming. The ability to digitally adjust each eye's view horizontally and/or vertically enables the camera system to compensate for the positional variations caused by the lens eccentricities. In one implementation, the processor 730 corrects for any lens eccentricity using a look-up table of crop values defined for the lens at various levels of zoom.

Figure 8A:
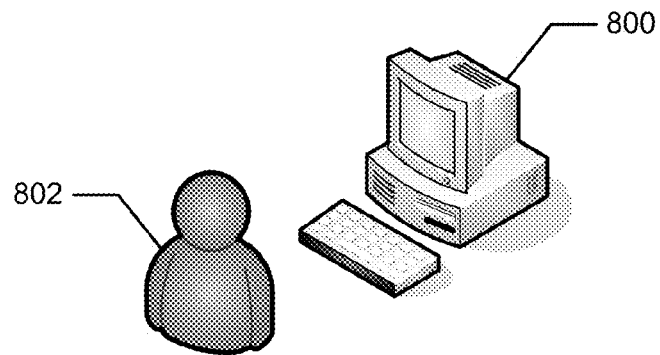
FIG. 8A illustrates a representation of a computer system and a user.

FIG. 8A illustrates a representation of a computer system 800 and a user 802. The user 802 uses the computer system 800 to perform automatic convergence of a plurality of images. The computer system 800 stores and executes a stereoscopic camera processing system 890.

Figure 8B:
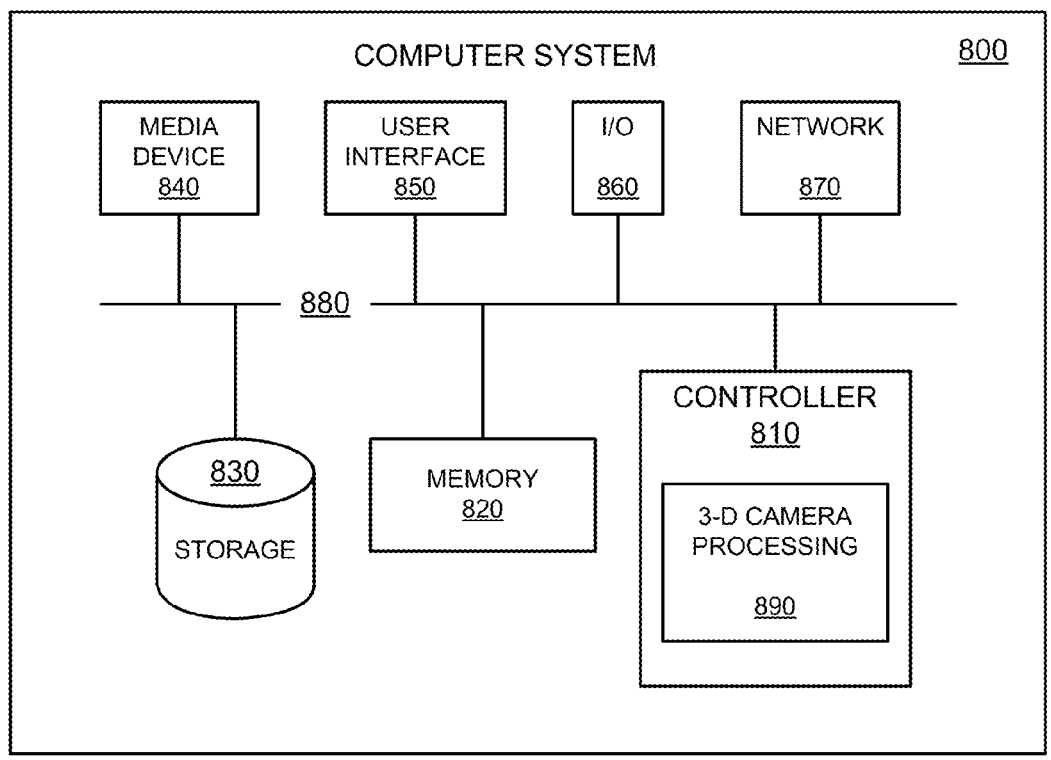
FIG. 8B is a functional block diagram illustrating the computer system hosting a stereoscopic camera processing system.

FIG. 8B is a functional block diagram illustrating the computer system 800 hosting the stereoscopic camera processing system 890. The controller 810 is a programmable processor and controls the operation of the computer system 800 and its components. The controller 810 loads instructions (e.g., in the form of a computer program) from the memory 820 or an embedded controller memory (not shown) and executes these instructions to control the system. In its execution, the controller 810 provides the stereoscopic camera processing system 890 as a software system, such as to provide the automatic convergence calculations (e.g., determining what cropping to use and how to crop the image data). Alternatively, this service can be implemented as separate hardware components in the controller 810 or the computer system 800.

Memory 820 stores data temporarily for use by the other components of the computer system 800. In one implementation, memory 820 is implemented as RAM. In one implementation, memory 820 also includes long-term or permanent memory, such as flash memory and/or ROM.

Storage 830 stores data temporarily or long term for use by other components of the computer system 800, such as for storing data used by the stereoscopic camera processing system 890. In one implementation, storage 830 is a hard disk drive.

The media device 840 receives removable media and reads and/or writes data to the inserted media. In one implementation, for example, the media device 840 is an optical disc drive.

The user interface 850 includes components for accepting user input from the user of the computer system 800 and presenting information to the user. In one implementation, the user interface 850 includes a keyboard, a mouse, audio speakers, and a display. The controller 810 uses input from the user to adjust the operation of the computer system 800.

The I/O interface 860 includes one or more I/O ports to connect to corresponding I/O devices, such as external storage or supplemental devices (e.g., a printer or a PDA). In one implementation, the ports of the I/O interface 860 include ports such as: USB ports, PCMCIA ports, serial ports, and/or parallel ports. In another implementation, the I/O interface 860 includes a wireless interface for communication with external devices wirelessly.

The network interface 870 includes a wired and/or wireless network connection, such as an RJ-45 or "Wi-Fi" interface (including, but not limited to 802.11) supporting an Ethernet connection.

The computer system 800 includes additional hardware and software typical of computer systems (e.g., power, cooling, operating system), though these components are not specifically shown in FIG. 8B for simplicity. In other implementations, different configurations of the computer system can be used (e.g., different bus or storage configurations or a multi-processor configuration).

The above description of the disclosed implementations is provided to enable any person skilled in the art to make or use the invention. Various modifications to these implementations will be readily apparent to those skilled in the art, and the generic principles described herein can be applied to other implementations without departing from the spirit or scope of the invention. Accordingly, additional implementations and variations are also within the scope of the invention. For example, the illustrated implementations discuss using two offset image sensors. In other implementations, the sensors are not offset but instead more of the image is cropped (this implementation will likely also use more image sensor material). Similarly, while the illustrated implementation discusses converging two 2-D images into a single stereoscopic image, more than two 2-D images can be converged into the resultant stereoscopic image. Further, it is to be understood that the description and drawings presented herein are representative of the subject matter which is broadly contemplated by the present invention. It is further understood that the scope of the present invention fully encompasses other implementations that may become obvious to those skilled in the art and that the scope of the present invention is accordingly limited by nothing other than the appended claims.

The invention claimed is:

1. A method of automatically converging a pair of images for use in a stereoscopic camera system including a pair of 2-D cameras, the method comprising:
   receiving a focal distance from metadata from each of the pair of 2-D cameras;
   calculating a system focal distance of the stereoscopic camera system by averaging the focal distances received from the pair of 2-D cameras;
   determining a center of interest using the calculated system focal distance of the stereoscopic camera system;
   receiving the pair of images from the pair of 2-D cameras, wherein each of the pair of images is generated by each of the pair of 2-D cameras using the focal distance;
   horizontally cropping each of the pair of images by a certain amount on opposite side of the images which adjusts directions of view of the pair of 2-D cameras substantially enough to converge at the determined center of interest,
   wherein the pair of images converges into a single stereoscopic image at the center of interest; and
   vertically cropping the pair of images to adjust for eccentricities of lenses in the pair of 2-D cameras using a look-up table of crop values defined for the lens at various levels of zoom.

2. The method of claim 1, wherein the stereoscopic camera system further comprises
   a processor configured to automatically converge the pair of images captured by the pair of 2-D cameras.

3. The method of claim 1, wherein the pair of 2-D cameras are displaced by an inter-pupillary distance from each other.

4. The method of claim 3, wherein each of the pair of 2-D cameras comprises
   a lens; and
   an image sensor,
   wherein the image sensor is offset away from the middle of the inter-pupillary distance.

5. The method of claim 4, wherein horizontally cropping comprises
   cropping strips on far sides from the middle of the inter-pupillary distance to focus on distant objects, while cropping the strips on near sides from the middle of the inter-pupillary distance to focus on near objects.

6. A stereoscopic camera system for automatically converging a pair of images, the system comprising:
   a pair of 2-D cameras including a first 2-D camera and a second 2-D camera,
   wherein the first 2-D camera comprises a first lens which captures and projects a first image of the pair of images on a first image sensor, and the second 2-D camera comprises a second lens which captures and projects a second image of the pair of images on a second image sensor; and
   a processor configured to:
   (1) receive and process focal distances of the pair of images from metadata from the pair of 2-D cameras to calculate a system focal distance of the stereoscopic camera system by averaging the focal distances from the pair of 2-D cameras;
   (2) determine a center of interest using the calculated system focal distance of the stereoscopic camera system;
   (3) horizontally crop each of the pair of images by a certain amount on opposite side of the images which adjusts directions of view of the pair of 2-D cameras substantially enough to converge at the determined center of interest,
   wherein the pair of images converges into a single stereoscopic image at the center of interest; and
   (4) vertically crop the pair of images to adjust for eccentricities of lenses in the pair of 2-D cameras using a look-up table of crop values defined for the lens at various levels of zoom.

7. The system of claim 6, wherein the first 2-D camera and the second 2-D camera are configured to be displaced an inter-pupillary distance from each other.

8. The system of claim 7, wherein the first image sensor and the second image sensor are offset away from the middle of the inter-pupillary distance.

9. A stereoscopic camera system for automatically converging a pair of images, comprising:
   a pair of 2-D cameras, each 2-D camera comprising a lens which captures and projects an image on an image sensor; and
   a processor configured to:
   (1) vertically crop the pair of images to adjust for eccentricities of lenses in the pair of 2-D cameras using a look-up table of crop values defined for the lens at various levels of zoom;
   (2) receive and process focal distances of the pair of images from metadata to calculate a system focal distance of the stereoscopic camera system by averaging the focal distances from the pair of 2-D cameras;

(3) determine a center of interest using the calculated system focal distance of the stereoscopic camera system; and (4) horizontally crop each of the pair of images by a certain amount on opposite side of the images which adjusts directions of view of the pair of 2-D cameras substantially enough to converge at the determined center of interest, wherein the pair of images converges into a single stereoscopic image at the center of interest.

10. A non-statutory computer-readable storage medium storing a computer program for automatically converging a pair of images for use in a stereoscopic camera system including a pair of 2-D cameras, the computer program comprising executable instructions that cause a computer to:

receive a focal distance from metadata from each of the pair of 2-D cameras;

calculate a system focal distance of the stereoscopic camera system by averaging the focal distances received from the pair of 2-D cameras;

determine a center of interest using the calculated system focal distance of the stereoscopic camera system;

horizontally crop each of the pair of images by a certain amount on opposite side of the images which adjusts directions of view of the pair of 2-D cameras substantially enough to converge at the determined center of interest, wherein the pair of images converges into a single stereoscopic image at the center of interest; and vertically crop the pair of images to adjust for eccentricities of lenses in the pair of 2-D cameras using a look-up table of crop values defined for the lens at various levels of zoom.

* * * * *